2,920,118
Patented Jan. 5, 1960

2,920,118

PROCESS FOR THE PREPARATION OF ALKYL-ARYL COMPOUNDS

Ralph Landau, East Hills, Robert B. Egbert, Roslyn Heights, and Alfred Saffer, Bayside, N.Y., assignors, by mesne assignments, to Mid-Century Corporation, Chicago, Ill., a corporation of Delaware No Drawing. Application November 8, 1954
Serial No. 467,656

7 Claims. (Cl. 260—671)

This invention relates to processes for the preparation of alkyl-aryl compounds by the reaction of benzene and propylene in the presence of an acid reacting alkylation catalyst, such as aluminum chloride, to produce a reaction mixture containing monoisopropylbenzene, the diisopropylbenzenes, and higher poly-isopropylbenzenes, separating the cumene therefrom as one product and separating either the para-diisopropylbenzene or the meta-diisopropylbenzene fraction therefrom as another product, or separating both of the latter as products. The reaction of benzene with propylene in the presence of an acid reacting catalyst is known. In addition, cumene and para-diisopropylbenzene have achieved a measure of commercial success; and meta-diisopropylbenzene is of interest for the preparation of resorcinol via conversion to the di-hydroperoxide followed by cleavage by treatment with an acid. In connection with further commercial development of these materials, the art is confronted by the problem of providing each of these materials in the desired high purity or strength in an economic manner.

The discoveries associated with the invention and relating to solution of the above problems and objects achieved in accordance with the invention include: the provision of an economic process for obtaining both cumene and para or meta-diisopropylbenzene, or both, by the reaction of benzene and propylene in the presence of an acid reacting alkylation catalyst, recovering the desired products and recycling other products or by-products; and other objects which will be apparent as details or embodiments of the invention are set forth hereinafter.

In order to facilitate a clear understanding of the invention, the following preferred specific embodiments are described in detail.

Example 1

Into a suitable reactor having a corrosion resistant inner surface (e.g. glass, ceramic or corrosion resistant metal or alloy), equipped with agitating means such as a gas or mechanical device, and with a means for heating or cooling the contents thereof such as a coil or jacket, a reflux condenser, a gas inlet tube, and optionally a vent for passing off low boiling materials, there are charged:

25 parts by weight of aluminum chloride
480 parts benzene (C.P. or thiophene free)
12.5 parts isopropyl chloride (or 25 parts anhydrous hydrogen chloride feed during reaction time); then propylene (e.g. 95% propylene gas)

is absorbed therein over a period of about 1 to 2 hours or until desired amount of propylene is absorbed with agitation while the temperature is maintained in the range of about 70 to 80° C.; the feed rate being about 150 liters per hour at ordinary temperature and pressure. This temperature may be maintained either by passing cooling water through the indirect heat exchange means or by permitting the mixture to boil and refluxing condensate therefrom if the temperature tends to go too high, or passing steam through these means if the temperature tends to go too low.

The reaction mass is then cooled to room temperature, e.g. indirectly by means of cooling water, and then poured into about 500 parts of water; then about 100 parts of about 18% aqueous hydrochloric acid is added, and the resulting mixture agitated for about one-quarter hour. Then the mixture is allowed to stand, whereby two layers are formed. The upper hydrocarbon layer is recovered, washed with about one-half its volume of about 10% aqueous sodium hydroxide, and then with an about equal volume of water, and then dried by azeotropically distilling off the water with the lower boiling hydrocarbon present.

The hydrocarbon layer is then fractionated in an efficient column. The cumene fraction is recovered as one product, and either meta-diisopropylbenzene (B.P. 203.2° C.) or para-diisopropylbenzene (B.P. 210.4° C.), or both are recovered as separate products. The meta fraction may contain a small amount of the ortho isomer, if present in the reaction mixture; however, this is not objectionable from the commercial viewpoint.

The higher aromatics, mostly tri-isopropylbenzene, and other lower aromatics may be recycled. A small amount of by-product hexane formed in the reaction system may be removed, as desired.

Using a mol ratio of propylene to benzene of 1.4 and where only cumene and para-diisopropylbenzene are removed from the system, all other aromatics being recycled, there are obtained 14 parts by weight of para-diisopropylbenzene and 40 parts of cumene per 100 parts of hydrocarbon product mixture.

Substantially similar results are obtained if cumene and meta-diisopropylbenzene are the only aromatic products separated and recovered.

Example 2

The procedure of Example 1 is followed, except that the propylene to benzene mol ratio is 1.0, and 9 parts of the para-diisopropylbenzene or 8 parts of meta-diisopropylbenzene is recovered together with 50 parts of cumene per 100 parts of hydrocarbon product mixture.

Example 3

The procedure of Example 1 is followed, except that the propylene to benzene ratio is 0.8, and 6 parts of para-diisopropylbenzene or 12 parts of meta-diisopropylbenzene is recovered together with 50 parts of cumene per 100 parts of hydrocarbon product mixture.

The process of the invention may be conducted in a batch, intermittent or continuous manner, preferably the latter.

In a continuous process, there are charged into the reactor aluminum chloride and isopropyl chloride, together with benzene and propylene, a part of the reaction mixture being continually removed and catalyst and by-product aromatic hydrocarbons being continually recycled.

The upper or hydrocarbon layer of the removed material is continually separated, scrubbed with hydrochloric acid solution and then with dilute aqueous sodium hydroxide (5–15%) or the like alkaline material then washed with water.

The scrubbed hydrocarbon is then fractionated to remove a cumene fraction as a desired product. By-product hexane also may be removed, if desired. A diisopropylbenzene fraction may be removed, and then further fractionated to separate the para-diisopropylbenzene as a product. Higher alkyl aromatics and ortho and meta-diisopropylbenzene may be recycled.

If desired, a meta-diisopropylbenzene fraction may be separated, and the para-diisopropylbenzene may be recycled.

Readily available propylene stocks may be used, preferably free of other unsaturates. The reactor system may be provided with vents to pass off lower boiling hydrocarbons which do not react therein. The benzene feed should be free from other aromatics, desirable of low sulfur content and preferably sulfur free; it may contain some paraffins which may be separated out in the system.

Comparable results to the foregoing are obtained with various modifications thereof, such as the following. The catalyst may be any Friedel-Crafts type or acid reacting alkylation catalyst such as hydrogen fluoride, boron tri-fluoride, aluminum chloride, and the like. The ratio of propylene to benzene on a mol basis may be in the range of about 0.7 to about 1.5 mols of propylene per mol of benzene, preferably 0.8 to 1.4. Higher ratios give a system which is relatively uneconomical from the cumene production viewpoint, and lower ratios give a system which is uneconomical from both the cumene and the desired di-isopropylbenzene product production viewpoint.

The reaction temperature may be in the range of −80 to 150° C., preferably 50 to 110° C. for the aluminum chloride catalyst. The reaction time may be in the range of 0.1 to 10 hours, preferably 0.5 to 4 hours. Higher temperatures are generally associated with shorter times, and the catalyst, temperature and time conditions are selected to give the desired conversion at the desired throughput rates. Additional aluminum chloride catalyst may be added as required (e.g. as determined by a spot check alkylation reaction using as catalyst a sample of the sludge being recycled for catalytic activity). The spent catalyst is treated with water containing 15–30% hydrochloric acid, to break the catalyst complex, and the resulting hydrocarbon phase is separated and reused in the system.

In view of the foregoing discussions, variations and modifications of the invention will be apparent to one skilled in the art, and it is intended to include within the invention all such variations and modifications except as do not come within the scope of the appended claims.

This application is a continuation-in-part of applications Serial No. 305,972, filed August 23, 1952, and Serial No. 394,318, filed November 25, 1953, both now abandoned.

We claim:

1. In a continuous process for the concurrent preparation in a single reaction zone of cumene and one of the isomeric diisopropylbenzenes selected from the group consisting of the meta- and para-isomers, the steps comprising continuously feeding to said zone as reactants propylene, benzene and the below described remainder of a hydrocarbon fraction, contacting said reactants with an acid reacting alkylation catalyst selected from the group consisting of aluminum chloride, hydrogen fluoride and boron trifluoride at a temperature in the range of −80 to 150° C. at a time in the range of 0.1 to 10 hours and with a molar ratio of propylene to benzene in the range of 0.7 to 1.5 to produce a reaction mixture containing an aromatic hydrocarbon fraction comprising cumene, diisopropylbenzenes and higher polyisopropylbenzenes, continuously and concurrently separating both cumene and one of said isomeric diisopropylbenzenes each as a product leaving a remainder of said hydrocarbon fraction for recycle.

2. A process of claim 1 wherein the catalyst is aluminum chloride.

3. A process of claim 2 in which the molar ratio of propylene to benzene is in the range 0.8 to 1.4, the temperature in the range 50 to 110° C. and the time is in the range of 0.5 to 4 hours.

4. A process of claim 1 wherein the catalyst is hydrogen fluoride.

5. A process of claim 1 wherein the catalyst is boron trifluoride.

6. A process of claim 1 wherein para-diisopropylbenzene is recovered as a desired product.

7. A process of claim 1 wherein meta-diisopropylbenzene is recovered as a desired product.

References Cited in the file of this patent

UNITED STATES PATENTS

| | | |
|---|---|---|
| 2,143,493 | Stanley et al. | Jan. 10, 1939 |
| 2,275,312 | Tinker et al. | Mar. 3, 1942 |
| 2,403,785 | Britton et al. | July 9, 1946 |
| 2,450,652 | Francis et al. | Oct. 5, 1948 |
| 2,545,671 | Passino | Mar. 20, 1951 |
| 2,730,557 | Max et al. | Jan. 10, 1956 |
| 2,817,688 | Enos | Dec. 24, 1957 |
| 2,855,430 | Landau et al. | Oct. 7, 1958 |

FOREIGN PATENTS

| | | |
|---|---|---|
| 773,502 | Great Britain | Apr. 24, 1957 |
| 782,084 | Great Britain | Aug. 28, 1957 |
| 794,570 | Great Britain | May 7, 1958 |

OTHER REFERENCES

Slanina et al.: Jour. Amer. Chem. Soc., vol. 57 (September 1935), pages 1547–1549.

Newton: Jour. Amer. Chem. Soc., vol. 65, March 1943, pp. 320–323.